United States Patent [19]
Iacchetta

[11] Patent Number: 5,267,909
[45] Date of Patent: Dec. 7, 1993

[54] POWER TRANSMISSION CHAIN CONSTRUCTED WITH BUTT STYLE LINKS

[75] Inventor: Nicholas A. Iacchetta, Rochester, N.Y.

[73] Assignee: Borg-Warner Automotive, Inc., Sterling Heights, Mich.

[21] Appl. No.: 914,767

[22] Filed: Jul. 15, 1992

[51] Int. Cl.⁵ .............................................. F16G 13/02
[52] U.S. Cl. ................................... 474/206; 474/209
[58] Field of Search ............... 474/206, 207, 212–217

[56] References Cited
U.S. PATENT DOCUMENTS

| | | |
|---|---|---|
| 2,101,341 | 10/1935 | Perry . |
| 2,428,060 | 9/1947 | Albrecht ............................ 474/209 |
| 2,667,791 | 2/1954 | Bremer . |
| 3,444,907 | 5/1969 | Chadwick ...................... 474/206 X |
| 4,186,617 | 2/1980 | Avramidis et al. . |
| 4,342,560 | 8/1982 | Ledvina et al. . |
| 4,759,740 | 7/1988 | Cradduck . |
| 5,092,822 | 3/1992 | Wakabayashi ...................... 474/209 |

Primary Examiner—Thuy M. Bui
Attorney, Agent, or Firm—Willian Brinks Olds et al.

[57] ABSTRACT

A roller chain is provided with the links having extending butt portions to prevent excess inward movement of the chain. The butts may be located on the inner links or outer links. A silent chain with block lacing is also provided with the butt portions on the guide links.

13 Claims, 2 Drawing Sheets

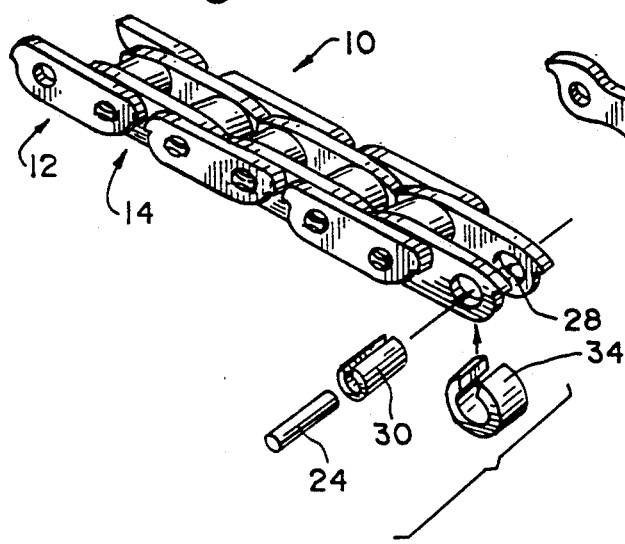
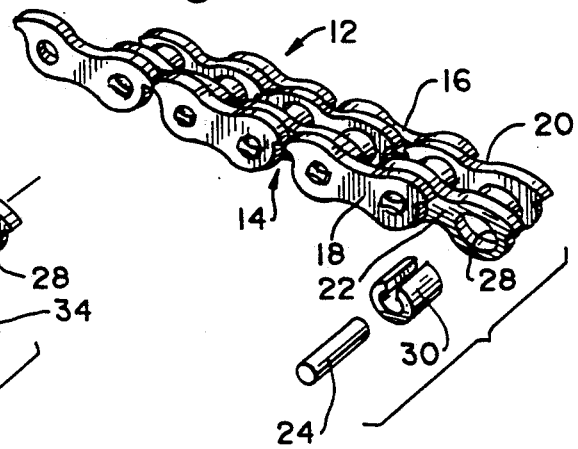
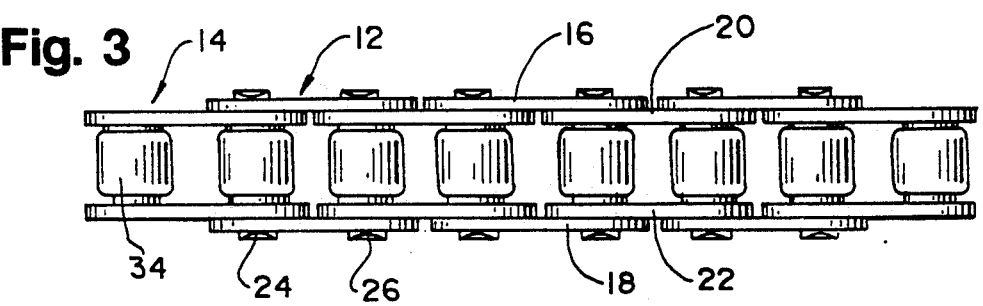
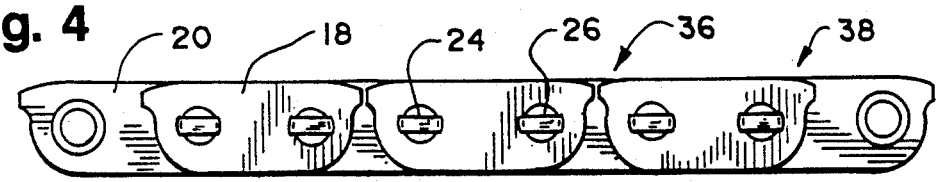
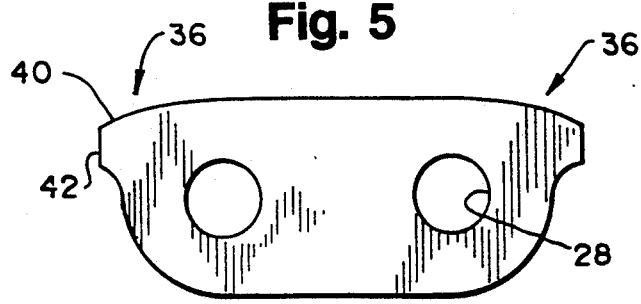

POWER TRANSMISSION CHAIN CONSTRUCTED WITH BUTT STYLE LINKS

BACKGROUND OF THE INVENTION

1. Field of the Invention

The present invention relates generally to power transmission chains. The invention has particular application to power transmission chains of the roller chain variety, which are used in engine timing applications as well as in industrial applications. The invention also has particular application to silent chains with block style lacing patterns.

2. Description of the Prior Art

Power transmission chains are widely used in the automotive industry. Such chains are used for engine timing drives as well as for the transfer of power from the engine to the transmission or for the transfer of power in a transfer case. Power transmission chains are also widely used in industrial applications.

One type of power transmission chain is know as "roller chain". A typical roller chain consists of interleaved, alternate inner links and outer links. The inner links, which are also know as "bushing" links, consist of spaced link plates, or sidebars, with bushings tightly received in openings, or apertures, at each end of the sidebars. The outer links consist of spaced link plates, or sidebars, with pins tightly received in openings, or apertures, at each end of the sidebars. The bushings freely rotate about the pins to pivotally connect the outer links to the inner links in alternate arrangement. Rollers are provided on the bushings, and when the roller chain is wrapped about a sprocket, the teeth of the sprocket are received between the laterally spaced sidebars and the longitudinally spaced rollers. An example of roller chain is found in U.S. Pat. No. 4,186,617, which is incorporated herein by reference.

Roller chain drives can include both "true roller" and rollerless design. The true roller design includes the described rollers mounted about the bushings. Rollerless chain contains bushings that directly contact the sprocket. Both types of roller chain are typically specified in industry as British Standard chain and American National Standards Institute (ANSI) chain.

A second type of power transmission chain is referred to as "silent chain". Such chain is formed of interleaved sets of inverted tooth links. A set or rank of links is assembled from several links positioned alongside of or adjacent to each other. Each link has a body with a pair of spaced apertures and the apertures of one set of links are arranged and aligned with the apertures of the next adjacent set of interleaved links. The links have a pair of depending toes separated by a crotch. The links are connected by pivot means, which are typically round pins received in the apertures. The pivot means can also be rocker joints, which consist of pins and rockers. An example of silent chain is found in U.S. Pat. No. 4,342,560, which is incorporated herein by reference. An example of silent chain which can be used in engine timing applications is found in U.S. Pat. No. 4,759,740, which is also incorporated herein by reference.

A conventional power transmission drive is comprised of either a silent chain or a roller chain wrapped about at least two sprockets supported by shafts. The chain is endless and assembled from interconnected links that are adaptable to fit over and about teeth formed on the sprockets. Movement of a driving sprocket causes power transmission through the chain and consequent movement of a driven sprocket. In an engine timing drive application, the driving sprocket may be mounted on the engine crankshaft and the driven sprocket mounted on a valve camshaft. The rotation of the camshaft is thus controlled by the rotation of the crankshaft through the roller chain. Timing drive applications can also include the use of a power transmission chain in the camshaft to camshaft drive in an overhead camshaft engine.

The present invention relates to the control of the chain movement, specifically the prevention of back-bending of the chain. Typically, a chain tensioner or snubber or other external device is provided along the outside of the chain in order to control inward movement of the chain as it passes between the sprockets of the chain and sprocket assembly. The tensioner acts to control the chain by providing a load against the back surfaces of the chain links. The tensioner may be placed on either the tight side or the slack side of the chain.

The present invention seeks to provide control of the chain without the need for an external control such as a tensioner. Chain control is achieved by the use of extending butt portions on the links in order to prevent back-bending of the chain. Butt-style links have been used in the prior art in silent chains having bushings in the link apertures and, more recently, on the inverted tooth links in inverted tooth silent chains. The butts have typically been used to prevent excess rotation of the links and wear of the bushings within the link aperture.

The present invention is directed to a construction of a butt-style link for a roller chain. An embodiment of silent chain with block lacing is also described in which the butt-style links are utilized on the guide links.

SUMMARY OF THE INVENTION

In accordance with one embodiment of this invention, a roller chain is provided with sets of outer links having an extending portion or butt portion. The butt portions, which are located at the upper edge of the links, act to prevent back bending of the chain. By the use of butt-style links, the need for external chain control in the form of a tensioner or snubber is reduced or eliminated. The butt portions may be located on the inner links or the outer links. An alternate embodiment is also described having butt-style guide links in a silent chain with block lacing.

In the roller chain embodiment, a roller chain is provided for use with a pair or series of sprockets. The chain is comprised of a series of interleaved inner links and outer links. Each outer link has a pair of outer link plates fixedly mounted to spaced pin members. Each inner link has a pair of bushings mounted to turn on the pins of the outer links. The inner links each have inner link plates fixedly mounted to the bushings. Each bushing is adapted to contact the teeth of the sprocket. Each of the inner links and outer links is adapted to receive a sprocket tooth between them. Rollers may be provided for rotation about the bushings and to provide contact surfaces for the sprocket teeth.

In the roller chain embodiment, the link plates include butt portions extending from the upper portions of the links. The butts extend from the upper surface of the links and have a tab portion, with a surface even with the top of the link, and a base portion which extends downward from the tab. The butt portions may be located on the inner links only, or the outer links only, or both the inner and outer links. When the chain is pulled tightly between the sprockets, or wrapped around the sprockets for use, the tab portions of adjacent links are in spaced apart relation. In this manner, the butts will contact when the chain attempts to move in an extreme inward direction and will act to control or substantially limit excess inward movement.

In another embodiment of the invention, the butt-style links are used in a silent chain having a block lacing. In the silent chain embodiment, the butt portions are located on the upper portions of the guide links. By providing butts on the guide links, butts are not needed on the inverted tooth links. In a block laced chain, the inverted tooth links are stacked side-by-side in blocks in rows and interleaved with guide links. The rows of guide links do not contain any inverted tooth links. The butts on the guide links act to control inward movement of the chain when in use.

The chain embodiments of this invention are suitable for use with a variety of sprocket tooth forms, including sprockets with dual teeth.

BRIEF DESCRIPTION OF THE DRAWINGS

For a more complete understanding of the invention, one should refer to the embodiments illustrated in greater detail in the accompanying drawings and described below by way of examples of the invention. In the drawings, which are not to scale:

FIG. 1 is a perspective view of a roller chain of the present invention, shown partly in exploded view;

FIG. 2 is a perspective view of a roller chain of the present invention, shown partly in exploded view;

FIG. 3 is a plan view of a roller chain of the present invention;

FIG. 4 is a side view of the chain of FIG. 3;

FIG. 5 is a side view of the link of the roller chain, showing the extending butt portions;

DETAILED DESCRIPTION OF THE DRAWINGS

Figure 6:
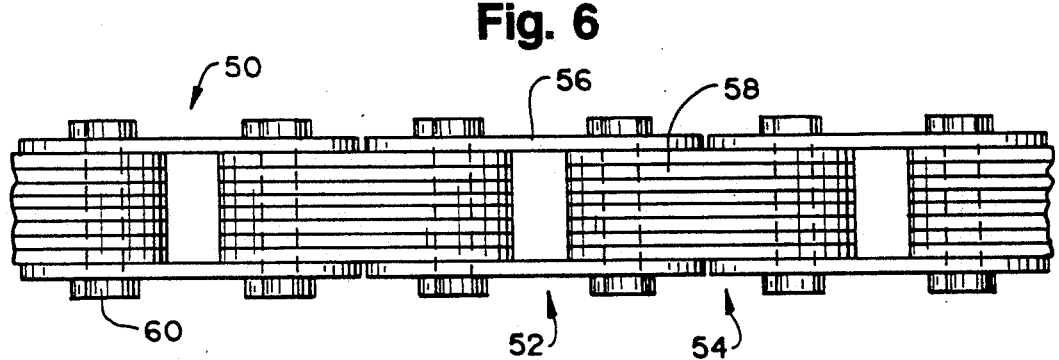
FIG. 6 is a plan view of an alternative the present invention, illustrating a block laced silent chain.
Figure 8:
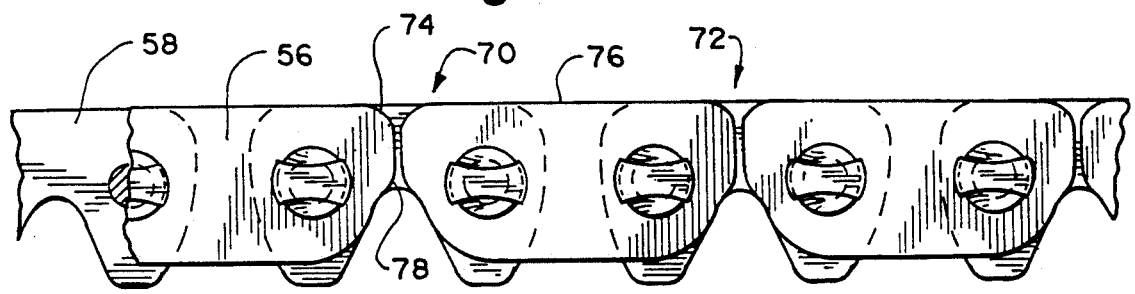

Turning now to the drawings, FIGS. 1 and 2 illustrate a portion of the chain of the present invention generally at 10. The chain is constructed by a series of links, pins, bushings and rollers. The chain includes a series of interleaved outer links 12 and inner links 14, which are shown more clearly in FIG. 3. The outer links are formed by a pair of outer link plates 16, 18, or sidebars. The inner links are likewise formed by a pair of inner link plates 20, 22, or sidebars.

The outer link plates 16, 18 are fixed to a pair of pins 24, 26. The pins are spaced apart and fitted through apertures 28 in the outer link plates. The pins are secured in the outer link plates by a press fit, or welding, caulking or any other means known in the art. The distance between the pins of a conventional roller chain measured along the length of the chain is the pitch of the chain.

The inner link plates 20, 22 are fixed to a pair of bushings. The bushings 30 are generally cylindrical in shape and spaced apart and fitted through apertures 28 in the inner link plates. The bushings are secured in the inner link plates by a press fit, or by welding, caulking or any other means known in the art.

The bushings are mounted about the pins and are freely rotatable about the pins. Thus, rotation of the bushings about the pins allows pivoting of the outer links with respect to the inner links. In the chain shown in FIG. 1, rollers 34 are mounted about the bushings and are freely rotatable about the pins. The rollers are generally cylindrical in shape.

Thus, the chain of FIG. 1, is constructed by inserting the pin within the bushing and the bushing within the roller. The bushings and rollers are generally formed with a split ring, as shown in FIGS. 1 and 2. The bushings are then secured to a pair of inner link plates and the pins are then secured to a pair of outer link plates. The inner links and outer links are alternated in series to form an endless chain. The length of the chain and exact number of inner and outer links is determined by, among other things, the application and ratio and center distance between the sprockets.

The rollers of the chain contact the teeth of the sprocket (not shown). The rollers seat in the root between the sprocket teeth. The outer links and inner links are constructed so that the teeth of the sprocket can be received between the link plates and between the rollers.

The chain drive system typically includes a driving sprocket and a driven sprocket (not shown) and the endless chain interconnecting the sprockets. In an engine timing drive, the system can include an idler sprocket or dual driving sprockets on a crankshaft. Movement of the driving sprocket transfers power, or causes movement of the driven sprocket, through movement of the chain.

As shown in FIGS. 4 and 5, the link plates include extending butt portions 36, 38. The butt portions include a tab member portion 40 that extends from the upper surface 41 of the links plate. The butt portions also include a base portion 42 that extends downwardly from the surface portion of the link plate into the side of the link plate. The upper surface of the tab portion preferably extends downward as the butt extends outward from the center of the link. The ends of the butts may be rounded with blend radii, or may be flat with sharp corners. The downward extension of the butt allows use of the link with a snubber and will avoid interference between the snubber and the butt.

When the chain is assembled and the links are pulled tightly between a pair of sprockets in the tight span of the chain, the tab portions of adjacent links are preferably in spaced apart relation, as shown in FIG. 4. The spaced relation allows articulation of the links of the chain and flexibility in movement. However, in operation, when the chain attempts to move inward or undertake back-bending, the butts contact and prevent excess inward or back-bending movement. This form of chain control by the extensions on the links avoids the need for a tensioner or other form of external chain control.

In the silent chain embodiment of the present invention, the chain of the present invention is constructed with a block lacing. Such a block lacing is illustrated in FIG. 6. An example of block lacing in chain for an engine timing drive is shown in U.S. Pat. No. 4,759,740, which is incorporated herein by reference. The inside links are substantially identical and stacked side-by-side in the row to form a block. Rows or sets of such block laced inside links are preferably alternated with guide link rows. The sets of guide links do not contain any sprocket tooth contacting members.

Figure 7:
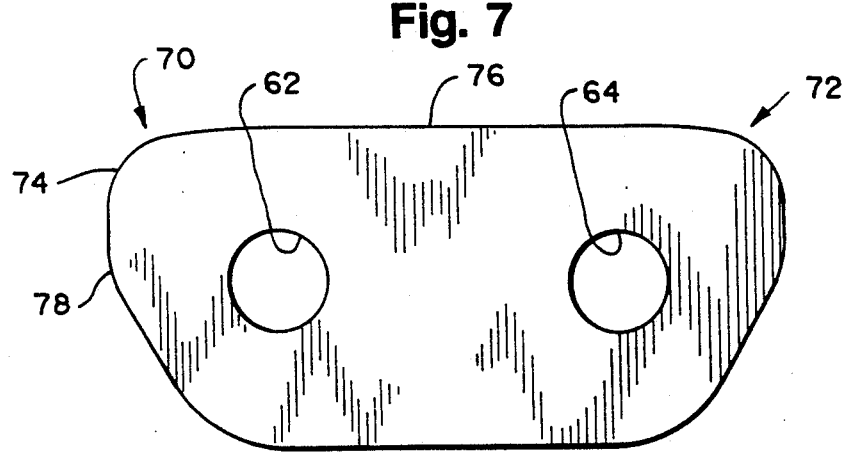
FIG. 7 is a side view of a guide link of the silent chain of FIG. 6, illustrating the extending butt portions; and, FIG. 8 is a side view of guide links, illustrating the separation of links in the assembled chain in the tight strand.

FIG. 6 illustrates a portion of the silent chain embodiment of the present invention in a power transmission chain shown at 50. The chain includes sets or rows of interleaved links. In the embodiment of FIG. 6, the chain includes guide link rows 52 interleaved with inside link rows 54. The guide link rows are comprised of guide links 56, while the inside link rows are comprised of inside or inverted tooth links 58. The guide links are shown more clearly in FIG. 7.

The complete chain drive (not shown) includes an endlessly connected chain wrapped about at least a pair of sprockets. The sprockets are mounted on shafts, such as an engine crankshaft or engine camshaft. The sprockets may be of different diameters and may have a different number of differently shaped teeth.

The rows or sets of links are formed of a plurality of links interleaved in side-by-side relationship. The inverted tooth links 58 are preferably alternated with the guide links 56. The adjacent sets of links are joined by pivot means 60, which can include round pins or a pin and rocker joint. The pivot means are received in aligned sets of apertures 62, 64. Each link preferably includes a pair of apertures located at opposite ends of the link.

The guide links maintain the lateral alignment of the chain on the sprockets. The guide links are along the outside of the chain and have no intended driving engagement with the sprocket teeth. In this regard, the guide links are distinguished from the inverted tooth links, or driving links. The pivot means is shaped for a press fit within the apertures of the guide links. The pivot means is typically peened over to maintain the integrity of the chain assembly; however, other methods may be used if desirable.

In the block laced construction, the guide links have extending butt portions 70, 72. As in the roller chain construction, the butt portions include a tab portion 74 that has a surface substantially even with the upper surface 76 of the link plate. The butt portion also includes a base portion 78 which extends downwardly from the surface portion into the link plate. In the block laced construction, the butt portions are preferably provided only on the guide links, and not on the inverted tooth links.

In the preferred embodiments of both the roller chain and the block laced silent chain, the butts extend the length of the link to approximately twice the pitch length of the chain. The pitch lengths of the links may be varied throughout the chain by the use of differing lengths of butt portions. Another embodiment of a random roller chain such as that disclosed in co-pending U.S. application Ser. No. 776,994, filed Oct. 16, 1991, which is incorporated herein by reference, may be formed in this manner.

While several embodiments of the invention are illustrated, it will be understood that the invention is not limited to these embodiments. Those skilled in the art to which the invention pertains may make modifications and other embodiments employing the principles of this invention, particularly upon considering the foregoing teachings.

What is claimed is:

1. A roller chain assembly for use with a sprocket, said chain assembly having a series of interleaved inner links and outer links;

each outer link having a pair of outer link plates fixedly mounted to spaced pin members, said outer link plates having an upper portion and a lower portion;

each inner link having a pair of bushings rotatably mounted on said pin members, each inner link further having at least two inner link plates fixedly mounted to said bushings, said inner link plates having an upper portion and a lower portion;

said upper portions of said outer link plates and said inner link plates being disposed radially outward of said sprocket;

each of said inner links and said outer links being adapted to receive a sprocket tooth;

at least some of said link plates having a butt portion extending from said upper portion.

2. The chain assembly of claim 1 wherein said butt portion extends from the upper portion of said outer link plates.

3. The chain assembly of claim 1 wherein said butt portion extends from the upper portion of said inner link plates.

4. The chain assembly of claim 1 further butt portion extends from the upper portion of said inner link plates.

5. A roller chain assembly for use with a sprocket, said chain assembly having a series of interleaved inner links and outer links;

each outer link having a pair of outer link plates fixedly mounted to spaced pin members, said outer link plates having an upper portion and a lower portion;

each inner link having a pair of bushings being mounted to turn on said pin members, said inner links having inner link plates fixedly mounted to said bushings, said inner link plates having an upper portion and a lower portion;

said upper portions of said outer link plates and said inner link plates being disposed radially outward of said sprocket;

each of said inner links and said outer links being adapted to receive a sprocket tooth;

at least some of said link plates having a butt portion extending from said upper portion wherein said butt portion includes a tab member extending from the upper portion of the link plate, said tab member having a surface portion substantially even with a top edge of said link plate upper portion, said tab member having a base portion which extends downwardly from said surface portion into said link plate.

6. The chain assembly of claim 5 wherein said tab members of adjoining links are in spaced apart relation when said chain assembly is pulled tightly between sprockets.

7. A link plate for a roller chain assembly, said chain assembly including a plurality of interleaved sets of inner and outer links, said inner and outer links being interleaved by a series of pins and bushings and adapted to receive the teeth of a sprocket, pivot means connecting adjacent sets of links, said link plates being interleaved in said chain assembly, said link plate comprising:

a link body having an upper portion and a lower portion, a butt portion extending from said upper portion, said butt portion including a tab member extending from the upper portion of the link plate, said tab member having a surface portion substantially even with a top edge of said link plate upper portion, said tab member having a base portion which extends downwardly from said surface portion into said link plate.

8. The link plate of claim 7 wherein said tab member surface portion recedes downwardly from said top edge of said link upper portion.

9. A power transmission chain for use with a sprocket, said chain constructed of an assembly of links and pivot members, said chain comprising a plurality of sets of guide links interleaved with sets of inside links, each link having a pair of spaced apertures, the apertures of one link set being transversely aligned with one set of apertures of the next adjacent link set, said apertures being adapted to receive a pair of pivot members, said sets of inside links having inverted tooth links stacked adjacent to each other thereby forming blocks, said sets of inside links being alternated with and separated by sets of guide links, said sets of guide links having pairs of flanking guide links, said flanking guide links having an upper portion and a lower portion, said upper portions of said flanking guide links being disposed outwardly of said sprocket, at least some of said flanking guide links having a butt portion extending from said upper portion.

10. The chain assembly of claim 9 wherein said butt portion includes a tab member extending from the upper portion of the link plate, said tab member having a surface portion substantially even with a top edge of said link plate upper portion, said tab member having a base portion which extends downwardly from said surface portion into said link plate.

11. The chain assembly of claim 10 wherein said tab members of adjoining links are in spaced apart relation when said chain assembly is pulled tightly between sprockets.

12. The chain assembly of claim 1 wherein said butt portion includes a tab member extending from the upper portion of the link plate, said tab member having a surface portion substantially even with a top edge of said link plate upper portion, said tab member having a base portion which extends downwardly from said surface portion into said link plate.

13. The chain assembly of claim 12 wherein said tab members of adjoining links are in spaced apart relation when said chain assembly is pulled tightly between sprockets.

* * * * *

UNITED STATES PATENT AND TRADEMARK OFFICE
CERTIFICATE OF CORRECTION

PATENT NO. : 5,267,909
DATED : December 7, 1993
INVENTOR(S) : Nicholas A. Iacchetta It is certified that error appears in the above-indentified patent and that said Letters Patent is hereby corrected as shown below:

In column 3, line 38, after "alternative" insert --embodiment of--.

IN THE CLAIMS

In claim 4, line 1, delete "butt portion extends from the upper portion of said inner link plates" and substitute --comprising rollers being mounted for rotation about said bushings of said inner links, said rollers being adapted to contact the teeth of a sprocket--

Signed and Sealed this

Nineteenth Day of March, 1996

Attest:

BRUCE LEHMAN

Attesting Officer

Commissioner of Patents and Trademarks